United States Patent [19]
Petolino, Jr. et al.

[11] Patent Number: 5,283,890
[45] Date of Patent: Feb. 1, 1994

[54] CACHE MEMORY ARRANGEMENT WITH WRITE BUFFER PIPELINE PROVIDING FOR CONCURRENT CACHE DETERMINATIONS

[75] Inventors: Joseph A. Petolino, Jr., Palo Alto, Calif.; Emil W. Brown, III, Cleveland Heights, Ohio

[73] Assignee: Sun Microsystems, Inc., Mountain View, Calif.

[21] Appl. No.: 12,621

[22] Filed: Feb. 2, 1993

Related U.S. Application Data

[63] Continuation of Ser. No. 516,322, Apr. 3, 1990, abandoned.

[51] Int. Cl.⁵ ............................................. G06F 13/14
[52] U.S. Cl. .................................. 395/425; 364/DIG. 1
[58] Field of Search ... 364/200 MS File, 900 MS File; 395/400 MS File, 425 MS File

[56] References Cited

U.S. PATENT DOCUMENTS

| | | | |
|---|---|---|---|
| 4,363,095 | 12/1982 | Woods et al. | 395/425 |
| 4,442,488 | 4/1984 | Hall | 395/425 |
| 4,527,238 | 7/1985 | Ryan et al. | 395/425 |
| 4,875,160 | 10/1989 | Brown, III | 395/375 |
| 4,926,323 | 5/1990 | Baror et al. | 395/375 |
| 4,942,518 | 7/1990 | Weatherford et al. | 395/800 |
| 4,980,819 | 12/1990 | Cushing et al. | 395/375 |

*Primary Examiner*—Joseph L. Dixon
*Assistant Examiner*—Reba I. Elmore
*Attorney, Agent, or Firm*—Blakely Sokoloff Taylor & Zafman

[57] ABSTRACT

A cache memory is arranged using write buffering circuitry. This cache memory arrangement comprises a Random Access Memory (RAM) array for memory storage operated under the control of a control circuit which receives input signals representing address information, write control signals, and write cancel signals. At least one address register buffer is coupled to the address input of the RAM, while at least one data register buffer is coupled to the data input of the RAM. Thus, in accordance with the present invention, addresses to be accessed in the RAM, as well as data to be written to the RAM, are buffered prior to being coupled to the RAM. As a result, systems utilizing the cache memory arrangement of the present invention need not stall or delay the output of information toward the RAM in order to check for a cache hit or miss. Such determinations can advantageously be made while the relevant address and data are in the register buffers en route to the RAM. Any write cancels necessitated by a cache miss then abort the write prior to the coupling of the write address and data to the RAM.

12 Claims, 2 Drawing Sheets

| CLOCK CYCLE | 1 | 2 | 3 | 4 | 5 | 6 | 7 | 8 | 9 |
|---|---|---|---|---|---|---|---|---|---|
| WRITE |  | W | W | W |  |  |  |  |  |
| ADDRESS | 1 | 2 | 3 | 4 | 5 | 6 | 7 | 3 |  |
| A REG |  | 1 | 2 | 3 | 4 | 5 | 6 | 7 | 3 |
| A BUFF 1 / D BUFF 1 | ? | ? | ? | 2 | 3 | 4 | 4 | 4 |  |
| A BUFF 2 / D BUFF 2 | ? | ? | ? | ? | 2 | 3 | 3 | 3 |  |
| A |  | 1 | ? | ? | 2 | 5 | 6 | 7 |  |
| D |  | ? | ? | ? | 2 | – | – | – |  |
| WE |  |  |  |  | WE |  |  |  |  |
| WC |  |  |  | (2) |  |  |  |  |  |

*Figure 2*

CACHE MEMORY ARRANGEMENT WITH WRITE BUFFER PIPELINE PROVIDING FOR CONCURRENT CACHE DETERMINATIONS

This is a continuation of application Ser. No. 07/516,322 filed on Apr. 3, 1990 now abandoned.

BACKGROUND OF THE INVENTION

1. Field of the Invention

This invention relates to computer systems and, more particularly, to methods and apparatus for reducing the access time for implementing store operations in a computer system.

2. History of the Prior Art

In computer systems, the access of main memory to retrieve information often takes a substantial portion of the operational time of the system. For this reason, the use of a cache memory to increase system speed has become prevalent in more advanced systems. A cache memory makes use of a relatively small amount of fast random access memory in which recently used instructions and data are stored as they are used by a processor. Such instructions and data are then available in the cache to be accessed by the associated processor more rapidly than they might be in main memory. The basic theory of caching is that, in general, information which has been recently used is more likely to be used sooner than is other information. The cache memory is often both physically faster than the random access memory used for main memory and is arranged so that it may be addressed more rapidly than may main memory. For example, in virtual memory systems, a cache does not need to go through the look-up operation of a memory management unit to determine the physical addresses necessary for accessing main memory. Such caching arrangements have operated to greatly increase the speed of operation of computer systems for certain types of information.

There are many forms of cache memory which may be provided for use with a particular processor. In most of these forms of cache memory, information from a number of different physical locations in main memory may map to the same location in cache memory. Consequently, after some finite period of time, information stored in a position in cache memory may have to be replaced by other information needed by the processor. Some cache memory systems (called write-back systems) do not transfer information written to the cache memory to main memory as soon as it is placed in the cache memory but retain that information until a later more convenient time. Such systems tend to make less use of the system bus and are thus faster.

In a write-back caching arrangement, valid information residing at a position in the cache in which new information is to be stored may not yet have been transferred to main memory so that the storage of the new information would cause the loss of the old information. Thus, data cannot be stored in the cache on a cache miss. For this reason, a store instruction typically requires a check for a cache miss; if there is not a miss, then the accessed information is in the cache, and a store may be accomplished. This check requires an extra clock cycle of operation and causes substantial delay in a pipelined computer system in which it is expected that a command will be executed on each clock cycle.

SUMMARY OF THE INVENTION

It is, therefore, an object of the present invention to accelerate the operation of a computer system.

It is another, more specific, object of the present invention to reduce the delay attendant upon the execution of a store instruction caused by the need to address the cache to determine whether a cache miss will occur before storing information to the cache.

These and other objects of the present invention are realized in a system comprising a cache memory, and data and address buffers such that a check for a cache hit or miss can be determined while the data and addresses associated with a store operation are in the data and address buffers, and in the event of a cache miss, the store operation can be terminated before the data and address are coupled to the cache memory.

These and other objects and features of the invention will be better understood by reference to the detailed description which follows taken together with the drawings in which like elements are referred to by like designations throughout the several views.

BRIEF DESCRIPTION OF THE DRAWINGS

FIG. 2 is a timing diagram illustrating the sequence of events occurring in a typical operation using the invention.

NOTATION AND NOMENCLATURE

Figure 1:
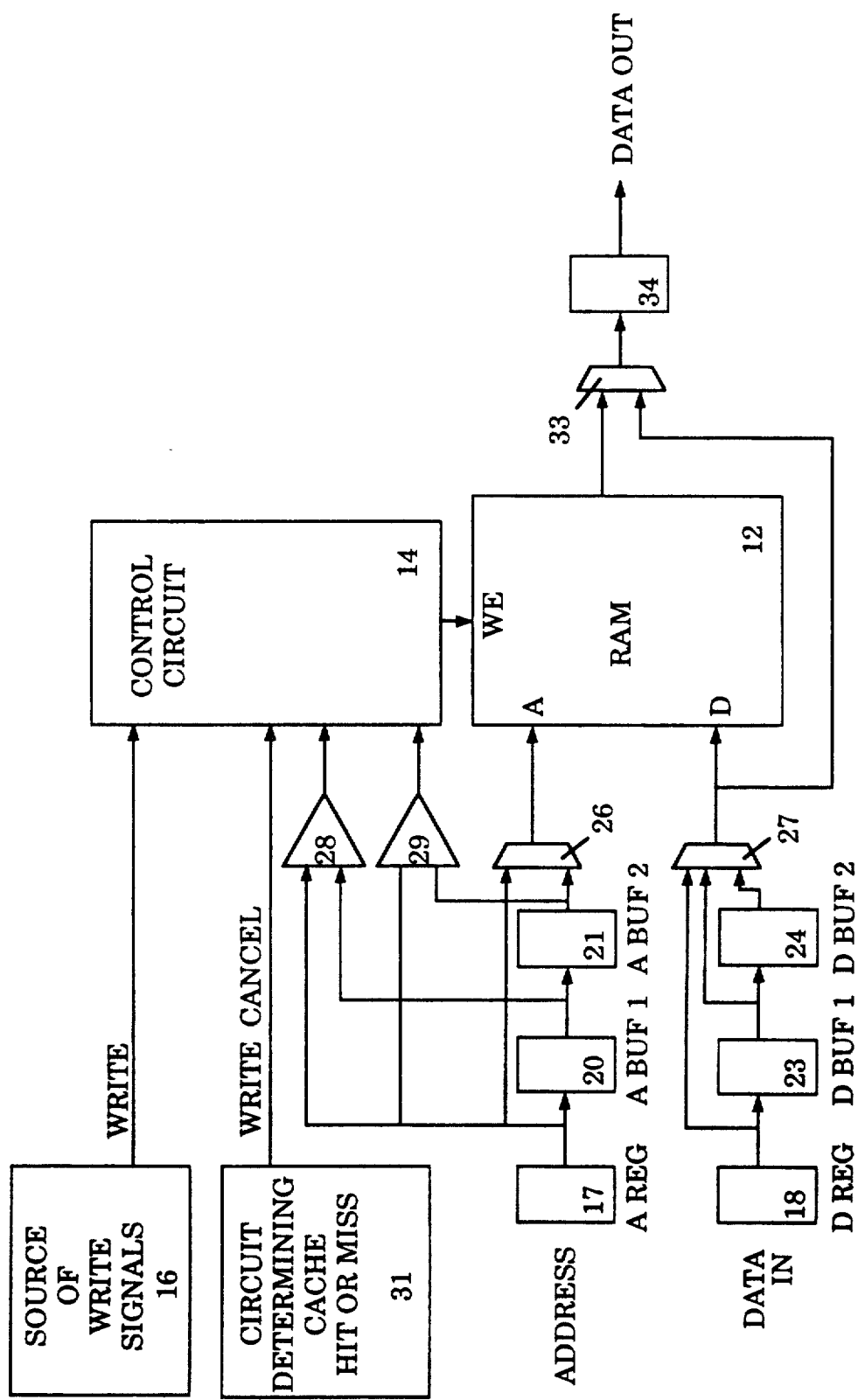
FIG. 1 is a block diagram of a cache memory arrangement constructed in accordance with the invention.

Some portions of the detailed descriptions which follow may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method of operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Referring now to FIG. 1 there is illustrated in block diagram form a memory arrangement 10 constructed in accordance with the present invention. The arrangement 10 includes an array of random access memory 12 which in the preferred embodiment is constructed of very fast memory devices. The random access memory 12 is utilized as cache memory for at least some portion of a computer system. Associated with the random access memory 12 is a control circuit 14. The control circuit 14 of the preferred embodiment may be a state machine adapted to produce certain output signals in response to selected input signals in a manner well known to the prior art. The control circuit 14, for example, receives input signals representing addresses being accessed, write control signals, and write cancel signals. The write signals are provided from a source of write signals 16 and are furnished directly to the control circuit 14. The address signals are furnished from a source such as a processor, not shown, to an address register 17. From the register 17 the address signals are used by a series of logic elements to provide control signals to the control circuit 14. The write cancel signals are furnished from circuitry 31 which determines whether or not a cache miss occurs on a store access of the random access memory 12.

The address register 17 is connected by a plurality of lines to a first address buffer register 20. The number of lines utilized is sufficient in the particular computer system to transfer all of the bits of an address in parallel to the first address buffer register 20. In like manner, the first address buffer register 20 is connected by a like number of lines to a second address buffer register 21. Each of the first address buffer register 20 and the second address buffer register 21 are constructed of circuitry adapted to store an address being accessed in the memory arrangement 10. It should be noted that any number of buffers might be used in the pipeline formed to produce the results produced by the invention with only minor variation in the circuitry.

Data to be stored in the random access memory 12 is furnished to a data register 18 from a source such as a processor, not shown. In a manner similar to the addressing arrangement, the data register 18 is connected by a plurality of lines to a first data buffer register 23. The number of lines utilized is sufficient in the particular computer system to transfer all of the bits of data to be stored in the random access memory 12 in a single store operation in parallel to the first data buffer register 23. The first data buffer register 23 is connected by a like number of lines to a second data buffer register 24. Each of the first data buffer register 23 and the second data buffer register 24 are constructed of circuitry adapted to store the data being stored in the memory arrangement 10. Again, a larger or smaller number of data buffer registers might be utilized; but the invention is more easily described with only two stages.

A multiplexor 26 receives input directly from the address register 17 and from the second address buffer register 21. Similarly, a multiplexor 27 receives input directly from the data register 18 and from both the first data buffer register 23 and from the second data buffer register 24. Each of the multiplexors 26 and 27 furnishes input to the random access memory 12 so that information selected to be stored at a particular address in random access memory 12 may be stored therein in a manner well known to the prior art.

A pair of comparators 28 and 29 furnish the results of a comparison of address inputs to the control circuit 14. These comparators each receive input directly from the address register 17. The comparator 28 also receives the address stored in the first address buffer register 20 while the comparator 29 also receives the address stored in the second address buffer register 21.

The random access memory 12 furnishes a data out signal on a plurality of lines to a multiplexor 23. The multiplexor 33 also receives data directly from the multiplexor 27. The data transferred by the multiplexor 33 is provided to a data out register 34 which operates to provide sufficient time for utilization of the output of the random access memory 12.

As explained above, in prior art systems, a store instruction typically requires a check for a cache miss; if there is not a miss, then the accessed information is in the cache, and a store may be accomplished. This requires a delay for a number of clock cycles of operation and causes substantial delay in a pipelined computer system in which it is expected that a command will be executed on each clock cycle. For example, it is expected that the invention will be utilized in a reduced instruction set computer (RISC) such as the Scalable Processor Architecture (SPARC) computers designed and manufactured by Sun Microsystems, Inc., Mountain View, Calif.

In order to obviate the delay caused by a check for a cache miss in such systems, the present memory arrangement 10 utilizes the first address buffer register 20, the second address buffer register 21, the first data buffer register 23, and the second data buffer register 24 to provide a buffered input to the random access memory 12 so that a sufficient time is provided to allow the tag portion of the cache to determine whether a miss has occurred at the address accessed for a store operation. This buffered input allows the pipeline to continue without the halt normally required in prior art systems in order to check for a cache miss and thereby substantially increases the speed of operation of the memory arrangement 10.

Referring again to FIG. 1, in the case of a read operation, the address to be read is placed in the address register 17 during a first clock cycle. Since the data is to be obtained from the cache or other memory, no data is placed in the data register 18. On the next clock cycle, the address in the address register 17 is furnished by the multiplexor 26 to the random access memory 12. This is the normal path for a read operation.

In a store operation, on the other hand, the address is furnished to the address register 17 and the data to be stored is placed in the data register 18 during a first clock cycle. It will be understood that in various schemes of operation, the data might lag the address by one clock cycle; however, to make understanding the operation easier, the data and the address for that data are considered to be furnished on the same clock cycle. On the next clock cycle, the address and data are placed, respectively, in the first address buffer register 20 and the first data buffer register 23. It should be noted that only a store causes information to be placed in the first address and data buffer registers 20 and 23. Upon the appearance of the next store operation, the address in the first address buffer register 20 and the data in the first data buffer register 23 are clocked into the second address buffer register 21 and the second data buffer register 24, respectively. This provides two clock cycles at the least in which the system may test to determine whether the address information is stored in the random access memory 12 before the new information is required to be placed at that address in the random access memory 12. Then, upon the appearance of the next store operation, the address in the second address buffer register 21 and the data in the second data buffer register 24 are clocked into the random access memory 12 at the addressed position by a write enable signal from the control circuit 14 directed to the random access memory 12. If the address accessed for the store operation is not present in the random access memory 12, however, the write enable signal is not furnished and the write operation is cancelled so that it will not write over information at the addressed position of the random access memory 12.

The two comparators 28 and 29 are utilized to allow a read operation to occur in a situation in which a store to an address has taken place but the information is not yet in the random access memory 12 because it has not yet propagated through in the pipeline provided by the first data buffer register 23 and the second data buffer register 24. The address to be read in the address register 17 is compared by the comparators 28 and 29 with the addresses held in the register stages of the address pipeline. If, on a read operation, the address in the address register 17 compares with the address in either the first address buffer register 20 or the second address buffer register 21, then the control circuit 14 causes the address in the related first data buffer register 23 or second data buffer register 24 to be selected by the multiplexor 27 and furnished directly through the multiplexor 33 to the output register 34 without waiting for the information to be stored in the random access memory 12.

The operation of the memory arrangement 10 may be better understood by referring to the timing diagram of FIG. 2. A number of system clock cycles from 1 through 9 are illustrated along the top of FIG. 2. At the left edge of the figure are listed the various signals. The figure illustrates the condition of these signals during each of the clock cycles shown.

In FIG. 2, it may be seen that a new address is furnished on the input address lines to the address register 17 on each clock cycle. The output of the address register 17 lags the input by one clock cycle. The write input signal is furnished in the example of FIG. 2 to the control circuit 14 during clock cycles 2–4 because addresses 2, 3 and 4 are the addresses to be written. These signals indicate to the control circuit 14 that the data signals furnished at that time on the data lines as input to the data register 18 are to be stored in the random access memory 12. These signals also indicate to the control circuit 14 that the address associated with the data is to be clocked into the first address buffer register 20. Consequently, the addresses 2, 3, and 4 are sequentially clocked into the first address buffer register 20 from the address register 17 and the data associated with those addresses are clocked into the first data buffer register 23 from the data register 18 on clock cycles 4, 5, and 6, respectively.

It should be noted that the information in the first address and data buffer registers 20 and 23 during the clock cycles 1–3 is indeterminate and not important to the operation of the memory array 10 as is indicated by the question marks shown during those clock cycles for the particular buffer registers. This is true because the buffer registers act as a first-in circuit and are only filled when a store cycle occurs. It is for this reason that the address 1 is not placed in the buffer pipline. Thus, on clock cycle 5, the signals in the first address and data buffer registers 20 and 23 (address 2) are placed in the second address and data buffer registers 21 and 24 when the address 3 information is placed in the first address and data buffer registers 20 and 23. In the same manner, on clock cycle 6, the signals in the first address and data buffer registers 20 and 23 (address 3) are placed in the second address and data buffer registers 21 and 24 when the address 4 information is placed in the first address and data buffer registers 20 and 23. Once the information is in the second address and data buffer registers 21 and 24, it is available to be written into the random access memory 12. It should be noted that the address 4 and data 4 signals are held in the first address and data buffer registers 20 and 23 after clock cycle 6 because there are no further store operations performed to cause those buffer registers to be necessary to later operations. In a like manner, the address 3 and data 3 signals are held in the second address and data buffer registers 21 and 24 after clock cycle 6 because there are no further store operations performed.

The address and data inputs to the random access memory 12 are illustrated as the A and D signals, respectively, in FIG. 2. As explained above, when the operation is a read operation, the address input to the random access memory 12 is furnished by the multiplexor 26 directly from the address register 17. Thus, on clock cycles 2, 6, 7, and 8, the addresses in the address register 17 are furnished to the random access memory 12 by the multiplexor 26. Since no data is required on a read operation, the information shown for the D input is indicated by a question mark during these clock cycles.

On the other hand, information is stored in the random access memory 12 only upon the occurrence of a store operation. Since the store information is read by the multiplexors 26 and 27 from the second address and data buffer registers 21 and 24, respectively, and those buffer registers are not yet filled when the first store address appears in the address register at clock cycle 3, no operation takes place even though a write enable signal is present at that clock cycle. The same thing happens at clock cycle 4. However, at clock cycle 5, address and data signals are present in the second address and data buffer registers 21 and 24, and this information is stored in the random access memory 12 upon the occurrence of a write enable signal. The write cancel signal may occur two clock cycles after the store operation commences to give the system time to ascertain whether a miss has occurred at the address accessed for the store operation without causing any delay in the pipeline of the operation (the write cancel signal would be asserted in clock 4 to cancel address 2). Consequently, the system operates at a substantially faster speed than do prior art systems.

The signal appearing on the address lines at clock cycle 8 should be noted. This is a read signal to address 3, an address which has not yet been stored in the random access memory 12 but resides in the second address buffer register 21. This address in the address register is compared to the address in the second address buffer register 21 by the comparator 29 and causes the control circuit 14 to enable the multiplexor 27 and the multiplexor 33 to transfer the data in the second data buffer register 24 to the output register 34 in the manner described above. One special advantage of the invention is that the very small amount of hardware required to implement the invention allows its placement directly on the random access memory chips so that the complex data and address path interconnections are within that chip thereby decreasing the complexity and pin count for the rest of the system.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A cache memory arrangement comprising:
   an array of Random Access Memory (RAM) for caching information, said RAM having an address input, a data input, a write enable input, and a data output;
   address buffer means having an address buffer input and an address buffer output, said address buffer output coupled to said address input of said RAM;
   data buffer means having a data buffer input and a data buffer output, said data buffer output coupled to said data input of said RAM;
   circuit means for determining whether a cache hit or miss has occured in response to an access directed to said RAM;
   control circuit means, coupled to said array of RAM and said circuit means, for selectively coupling write enable signals to said array of RAM;
   wherein an address transferred to said address buffer input is transferred from said address buffer input to said address buffer output while said circuit means determines whether a cache hit or miss has occurred;
   further wherein, data transferred to said address data input is transferred from said data buffer input to said data buffer output while said circuit means determines whether a cache hit or miss has occurred.

2. A cache memory arrangement comprising:
   an array of Random Access Memory (RAM) for caching information, said RAM having an address input, a data input, a write enable input, and a data output;
   a control circuit coupled to said array of RAM, said control circuit including means for selectively coupling write enable signals to said RAM;
   a first register coupled to said address input of said RAM;
   a second register coupled to said data input of said RAM;
   a third register coupled to said first register;
   a fourth register coupled to second register;
   a fifth register coupled to said third register;
   a sixth register coupled to fourth register;
   a first comparator circuit, said first comparator circuit including a first comparator input, a second comparator input, and a first comparator output;
   wherein said first, third, and fifth registers provide for address buffering, and said second, fourth, and sixth registers provide for data buffering in said cache memory arrangement;
   and further wherein said first comparator input is coupled to said first register, said second comparator input is coupled to said fifth register, and said first comparator output is coupled to a means for receiving address information in said control circuit.

3. The cache memory arrangement as provided in claim 2, further comprising:
   a second comparator circuit, said second comparator circuit including a third comparator input, a fourth comparator input, and a second comparator output;
   wherein said third comparator input is coupled to said third register, said second comparator input is coupled to said fifth register, and said second comparator output is coupled to said means for receiving address information in said control circuit.

4. The cache memory arrangement as provided in claim 3, further comprising:
   a first multiplexer, said first multiplexer including a first multiplexer input, a second multiplexer input, and a first multiplexer output;
   wherein said first multiplexer input is coupled to said first register, said second multiplexer input is coupled to said fifth register, and said first multiplexer output is coupled to said address input of said RAM such that said first multiplexer is disposed between said first register and said address input of said RAM.

5. The cache memory arrangement as provided in claim 4, further comprising:
   a second multiplexer, said second multiplexer including a third multiplexer input, a fourth multiplexer input, and a second multiplexer output;
   wherein said second multiplexer input is coupled to said second register, said fourth multiplexer input is coupled to said sixth register, and said second multiplexer output is coupled to said data input of said RAM such that said second multiplexer is disposed between said second register and said data input of said RAM.

6. The cache memory arrangement as provided in claim 5, further comprising:
   a third multiplexer, said third multiplexer including a fifth multiplexer input, a sixth multiplexer input, and a third multiplexer output;
   wherein said fifth multiplexer input is coupled to said data input of said RAM, and said sixth multiplexer input is coupled to said data output of said RAM.

7. In a computer system comprising cache memory, said cache memory having a data input and an address input, a method for obviating the need to delay a write operation to said cache memory to determine whether a cache hit or miss has occurred prior to outputting information associated with said write operation, said method comprising the steps:
   transferring an address associated with said write operation directed to said cache memory to an address buffer;
   transferring data associated with said write operation directed to said cache memory to a data buffer;
   determining whether a cache hit or miss has occurred for said write operation directed to said cache memory while said address is in said address buffer and said data is in said data buffer such that said computer system does not halt to make said determination;
   enabling said cache memory to read said address from said address buffer and said data from said data buffer in the event of a cache hit.

8. The method as provided in claim 7, wherein said data buffer comprises a first register having a first register input and a first register output wherein,
- said step of transferring data associated with said write operation comprises transferring said data to said first register input;
- said step of determining whether a cache hit or miss has occurred for said write operation while said address is in said address buffer and said data is in said data buffer comprises determining whether said cache hit or miss has occurred while said data is being transferred from said first register input to said first register output;
- said step of enabling said cache memory to read said address from said address buffer and said data from said data buffer in the event of a cache hit comprises enabling said cache memory to read said data from said first register output.

9. The method as provided in claim 8, wherein said address buffer comprises a second register having a second register input and a second register output wherein,
- said step of transferring an address associated with said write operation comprises transferring said address to said second register input;
- said step of determining whether a cache hit or miss has occurred for said write operation while said address is in said address buffer and said data is in said data buffer comprises determining whether said cache hit or miss has occurred while said address is being transferred from said second register input to said second register output;
- said step of enabling said cache memory to read said address from said address buffer and said data from said data buffer in the event of a cache hit comprises enabling said cache memory to read said address from said first register output.

10. The method as provided in claim 7, wherein said data buffer comprises a first plurality of registers having a first plurality of registers input and a first plurality of registers output wherein,
- said step of coupling an address associated with said write operation comprises transferring said address to said first plurality of registers input;
- said step of determining whether a cache hit or miss has occurred for said write operation while said address is in said address buffer and said data is in said data buffer comprises determining whether said cache hit or miss has occurred while said address is being transferred from said first plurality of registers input to said first plurality of registers output;
- said step of enabling said cache memory to read said address from said address buffer and said data from said data buffer in the event of a cache hit comprises enabling said cache memory to read said address from said first plurality of registers output.

11. The method as provided in claim 10, wherein said address buffer comprises a second plurality of registers having a second plurality of registers input and a second plurality of registers output wherein,
- said step of transferring an address associated with said write operation comprises transferring said address to said second plurality of registers input;
- said step of determining whether a cache hit or miss has occurred for said write operation while said address is in said address buffer and said data is in said data buffer comprises determining whether said cache hit or miss has occurred while said address is being transferred from said second plurality of registers input to said second plurality of registers output;
- said step of enabling said cache memory to read said address from said address buffer and said data from said data buffer in the event of a cache hit comprises enabling said cache memory to read said address from said second plurality of registers output.

12. The method as provided in claim 7, further comprising the following step:
- in the event of a cache miss for said write operation, not enabling said cache memory to read the data and addresses associated with said write operation from said data buffer and said address buffer, such that the data and addresses associated with said write operation are not written to a location in the cache memory.

* * * * *